United States Patent
Stroeder et al.

(10) Patent No.: US 9,089,803 B2
(45) Date of Patent: Jul. 28, 2015

(54) SEPARATOR FOR SEPARATING SOLID PARTICLES FROM A VAPOUR-GAS MIXTURE

(75) Inventors: Michael Stroeder, Frankfurt (DE); Christopher Wendtland, Graevenwiesbach (DE); Bernd Roos, Friedberg (DE); Aleksandr Kaidalov, Narva-Joesuu (EE); Kirill Kaidalov, Narva (EE)

(73) Assignee: ENEFIT OUTOTEC TECHNOLOGY OUE, Tallinn (EE)

(*) Notice: Subject to any disclaimer, the term of this patent is extended or adjusted under 35 U.S.C. 154(b) by 0 days.

(21) Appl. No.: 13/989,433

(22) PCT Filed: Nov. 23, 2011

(86) PCT No.: PCT/EP2011/070732
§ 371 (c)(1),
(2), (4) Date: Jun. 14, 2013

(87) PCT Pub. No.: WO2012/069501
PCT Pub. Date: May 31, 2012

(65) Prior Publication Data
US 2013/0269301 A1    Oct. 17, 2013

(30) Foreign Application Priority Data
Nov. 26, 2010    (EP) .................................... 10192802

(51) Int. Cl.
*B01D 45/00* (2006.01)
*B01D 45/16* (2006.01)
*B01J 8/00* (2006.01)

(52) U.S. Cl.
CPC ............... *B01D 45/16* (2013.01); *B01J 8/0055* (2013.01)

(58) Field of Classification Search
CPC ........ B01D 45/08; B01D 45/16; B01D 45/12; A47L 9/1683; F01M 13/04
USPC ................ 55/434.2, 447, 428, 429–433, 435; 366/83–84, 77, 79, 298, 318–323
See application file for complete search history.

(56) References Cited

U.S. PATENT DOCUMENTS 3,472,632 A * 10/1969 Weber et al. ................... 422/242
3,776,462 A * 12/1973 Payne, Jr. ...................... 239/134
(Continued)

FOREIGN PATENT DOCUMENTS

| EE | 04502 B1 | 6/2005 |
| WO | WO 9 533 159 A1 | 12/1995 |
| WO | WO 2009 030 241 A1 | 3/2009 |

OTHER PUBLICATIONS

European Patent Office, Search Report Application No. PCT/EP2011/070732 (Jan. 19, 2012).

*Primary Examiner* — Dung H Bui
(74) *Attorney, Agent, or Firm* — Leydig, Voit & Mayer, Ltd.

(57) ABSTRACT

A separator for separating solid particles from a vapor-gas mixture includes a dust chamber with a main body having an inlet for a vapor-gas mixture containing semi-coke particles and an outlet chute in a bottom of the main body for removal of semi-coke particles. The main body is covered with an external insulation. The separator also includes a cyclone, wherein an upper part of the main body is connected to an inlet of the cyclone for removal of fine semi-coke particles from the vapor-gas mixture. A screw conveyor unit is connected to a bottom part of the main body.

16 Claims, 5 Drawing Sheets

(56) References Cited

U.S. PATENT DOCUMENTS

| | | | |
|---|---|---|---|
| 4,240,877 A * | 12/1980 | Stahlherm et al. | 201/41 |
| 4,969,937 A * | 11/1990 | Tassicker | 55/382 |
| 6,149,083 A * | 11/2000 | McFarland | 241/82.5 |
| 6,506,311 B2 * | 1/2003 | DeGarmo et al. | 210/788 |
| 2002/0017195 A1 * | 2/2002 | Tolvanen | 96/66 |
| 2009/0193971 A1 * | 8/2009 | McFarland et al. | 95/220 |
| 2010/0180557 A1 | 7/2010 | Kaidolov et al. | |

* cited by examiner

SEPARATOR FOR SEPARATING SOLID PARTICLES FROM A VAPOUR-GAS MIXTURE

CROSS-REFERENCE TO PRIOR APPLICATIONS

This application is a U.S. national phase application under 35 U.S.C. §371 of International Application No. PCT/EP2011/070732 filed on Nov. 23, 2011, and claims benefit to European Patent Application No. EP 10192802.6, filed on Nov. 26, 2010. The international application was published in English on May 31, 2012, as WO 2012/069501 A1 under PCT Article 21(2).

FIELD

The present invention is related to a separator for separating solid particles from a vapour-gas mixture. The separator comprises a dust chamber, a cyclone, dust discharge conveyors and interconnecting ducts and chutes between the named components. The separator is part of a plant for processing by thermal treatment solids containing fossil or organic hydrocarbon substances.

BACKGROUND

Document EE 200100111 discloses a separator for separating solid particles from a vapour-gas mixture, wherein the separator comprises a dust chamber (main body) with refractory lining placed on its internal surface, an inlet for the vapour-gas mixture coming from a rotary kiln to the main body of the dust chamber, first and second-stage cyclones placed inside the main body of the dust chamber, and an outlet for separated semi-coke particles.

For process reasons the vapour-gas mixture shall not condense during contact with the walls of the vessels. Therefore the wall temperature has to be maintained above 500° C. and the walls shall resist the abrasive fine solid particles. In case of condensation, the fine solids and the condensed gas-vapour would form agglomerations which build up at the walls and openings. This may lead to massive operation disturbance or even to a total failure of the process.

Document WO 2009/030241 A1 discloses a separator (dust chamber) for separating solid particles from vapour-gas mixture comprising a main body with refractory lining placed on its internal surface and first and second-stage cyclones placed outside the main body of the dust chamber. The main body of dust chamber has a uniform diameter in its full height, where in the middle of the cylindrical body an inlet for a vapour-gas mixture containing semi-coke particles and in the bottom of the cylindrical body an outlet for removal of semi-coke particles is provided.

Despite of the improvements and construction changes, the separator of solid particles from vapour-gas mixture described in document WO 2009/030241 has certain shortcomings that decrease the separation efficiency and availability of the separator. Problems are caused by the internal refractory lining because it has to be resistant to the components and the temperature of the vapour-gas mixture. The temperature of the vapour-gas mixture is about 480 to 520° C. and it contains solid particles, which cause wear of the refractory lining, and corrosive elements, e.g. sulphur. Due to the porosity of the refractory material and potential cracks caused by heat cycles the vapour-gas mixture penetrate the refractory layers, which causes the hydrocarbon vapour in the vapour-gas mixture to condense on the inside metal wall of the main body of the dust chamber. This condensation is due to the fact that the temperature of the refractory lining and the metal surface is always lower than the temperature of the vapour-gas mixture. Solid particles separated from the vapour-gas mixture stick to these surfaces and lead to considerable material layers. Such layers need to be removed frequently during plant shut downs because they have a negative influence on the separation efficiency of the device. Such interruptions of the plant operation considerably reduce the plant availability.

Another disadvantage of the above-described separator is the fact that the small particles fraction, which is separated from the vapour-gas in the first and second stage cyclones, is discharged to the lower part of the main body of the dust chamber. From there some part of fine semi-coke particles (dust particles) will be entrained again into the vapour-gas mixture streams entering the dust chamber. A dust circuit is built up, which decreases the separation efficiency of the whole device.

SUMMARY

In an embodiment, the present invention provides a separator for separating solid particles from a vapour-gas mixture. The separator includes a dust chamber with a main body having an inlet for a vapour-gas mixture containing semi-coke particles and an outlet chute in a bottom of the main body for removal of semi-coke particles. The main body is covered with an external insulation. The separator also includes a cyclone, wherein an upper part of the main body is connected to an inlet of the cyclone for removal of fine semi-coke particles from the vapour-gas mixture. A screw conveyor unit is connected to a bottom part of the main body.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention increases the efficiency and reliability as well as decreases maintenance and repair time and overcomes the problems discussed above.

To that aim, embodiments of the present invention provide to:
  replace the internal refractory lining (cold wall design) by an external insulation (hot wall design);
  keep the external metal surfaces of the whole device on a temperature level equal or above the temperature of the vapour-gas mixture entering the device;

heat up the metal surfaces and maintain the temperature by electrical trace heating;

reduce the drop height of the solids entering the dust chamber by decreasing the height between bottom edge of dust chamber inlet nozzle and upper edge of dust discharge screw conveyor flights to a minimum allowed by construction;

increase the capacity of the dust discharge conveyor to reduce the dust retention time in the dust chamber lower part to an absolute minimum;

discharge the small particles fraction of the semi-coke separated in the cyclone directly into the casing of the dust chamber discharge conveyor (in order to break the fine dust circuit).

The proposed system contains a temperature control above the dew point of the vapour-gas mixture and the controlled discharge guarantees an air tight system. The smooth steel walls also avoid the penetration and stickiness of the vapour-gas mixture.

According to an embodiment of the invention there is provided a separator for separating solid particles from a vapour-gas mixture, the separator comprising a dust chamber with main body having an inlet for vapour-gas mixture containing semi-coke particles and an outlet chute in the bottom of the main body for removal of semi-coke particles, wherein the upper part of the main body is connected to the inlet of a cyclone for removal of fine semi-coke particles from the vapour-gas mixture and a screw conveyor unit is connected to the bottom part of the main body, wherein said main body is covered with an external insulation.

Preferably, electrical trace heating cables are in contact with the external surface of the main body of the dust chamber.

According to a preferred embodiment a layer of heat resistant stainless steel is mounted on the outside of the electrical trace heating cables to protect the cables from the insulation and the stainless steel layer is mounted in a way that it is not gas tight allowing leakage gases to be vented.

Preferably, the material of the external insulation of the main body is porous mineral wool material to enable leakage gases from the separator to be vented to the outer surface.

The external insulation is surrounded by a housing comprising at least two layers, wherein a first layer is made of glass fibre to protect the insulation layer and wherein the second, outer layer is made of a porous grid to enable leakage gases to be vented.

To withstand the influence by the vapour-gas mixture the main body, the shell of cyclone and/or the screw conveyor(s) are manufactured from stainless steel having sulphur resistant corrosion characteristics and preferably a chromium content between 5 to 50 wt.-% or from a nickel base alloy having sulphur resistant corrosion characteristics.

To accelerate the withdrawal of the particles from the dust chamber the screw conveyor unit comprises at least two, preferable up to 10 parallel screw conveyors for transportation of semi-coke particles from the dust chamber to a furnace for further technological processing and/or for transportation of fine semi-coke particles from cyclone to the furnace for further technological processing.

To avoid condensation of the vapour-gas mixture on the walls of the main body it is electrically trace heated to the temperature of the vapour-gas mixture. Preferably, the wall temperature of the main body is kept about 0.1 to 300 K, preferably 5 to 10 K higher than the temperature inside the dust chamber.

In addition, preferably also the cyclone, connection ducts and/or chutes are electrically trace heated.

According to a preferred embodiment the electrical heat circuits of the electrical trace heating are divided into up to 100 different zones to control the wall temperature as accurate and evenly as possible.

To prevent dust escape from the screw conveyor unit the latter comprises a housing covering all screw conveyors.

Preferably, the main body of the dust chamber is provided with an outlet vent in the upper part of main body to transport vapour-gas mixture containing semi-coke particles to the cyclones.

According to another preferred embodiment the screw conveyor has a stuffing zone at the discharge to seal the pressure difference between cyclone discharge duct and dust chamber.

Preferably, the screw conveyor has double helix screws, which can be shifted by difference of rotation speed to prevent clogging of solids.

The pyrolysis of pulverized fossil fuel (e.g. oil shale) or material containing organic matter using a solid heat carrier process takes place in retort and thereafter the vapour-gas mixture containing particles of semi-coke up to 1200 g/Nm$^3$ (at standard pressure and temperature), hydrocarbon vapours, water vapour, pyrolysis gas and other gases is directed to the separator 1 comprising a dust chamber 2 for separating solid particles from a vapour-gas mixture. The temperature of the vapour-gas mixture entering into the processing unit is at about 460-520° C.

The solids contained in the vapour-gas mixture are separated in this device by the gravitational settling of particles in the dust chamber 2 and by centrifugal forces in cyclones 3.

Figure 1:
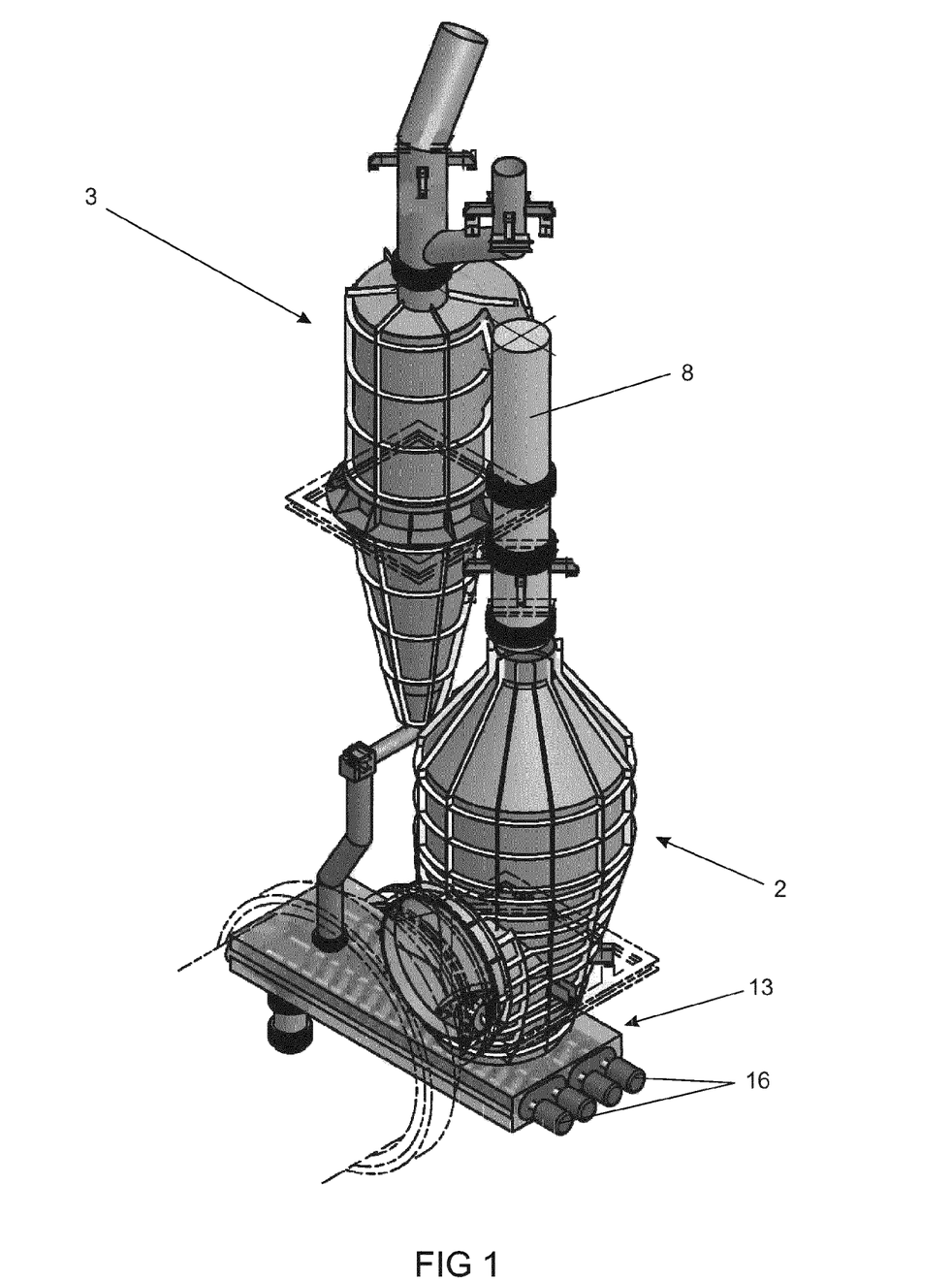
FIG. 1 shows the design of a dust chamber according to an embodiment of the present invention.
Figure 4:
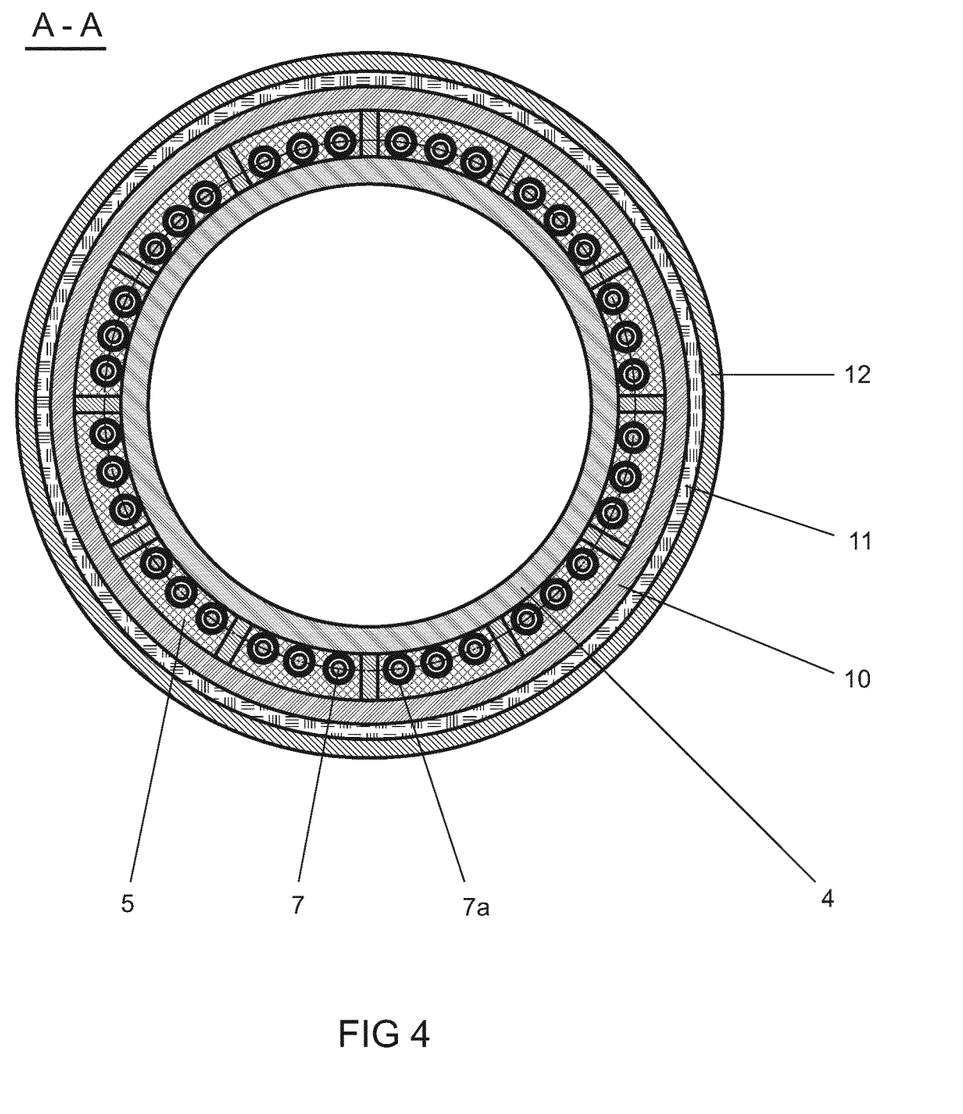
FIG. 4 is a cross section along line A-A in FIG. 2, and FIG. 5. is a cross section of screw conveyor unit along line B-B according to a preferred embodiment.

The separator 1 for separating solid particles from vapour-gas mixture according to the embodiment of the present invention illustrated in the FIG. 1 comprises the dust chamber 2 with a main body 4 (see FIG. 4), whose external surface is covered with an external insulation 5 and electrical heating cables 7. The external insulation 5 is made from mineral wool material to allow leakage gases to flow outside the insulation layer. To ensure that the temperatures are always maintained above the dew point of the vapour-gas mixture the wall temperature of the main body 4 is kept higher than the condensation temperature of the vapour-gas mixture and in particular at 0.1 to 300K, preferably at 1 to 50 K, and most preferred 5 to 10 K higher than the temperature inside the dust chamber 2.

Figure 2:
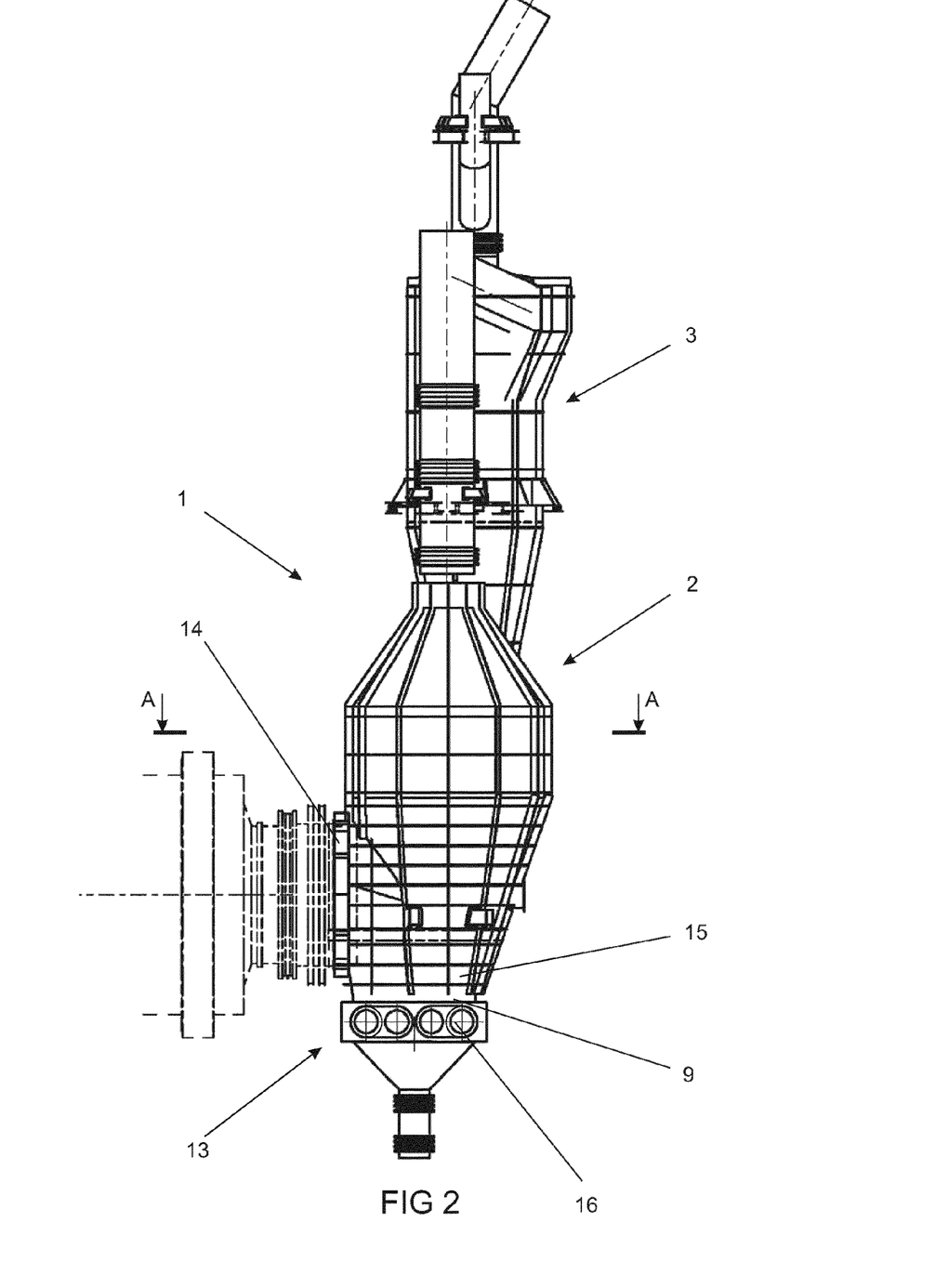
FIG. 2 shows the design of the external insulation and trace heating of the dust chamber according to an embodiment of the present invention.

The individual circuits of the electrically trace heating (main body 4 of the separator or dust chamber 2, cyclone 3, connection ducts 8 and chutes 9) are divided into different zones, e.g., up to 100 zones, which enables the control of the wall temperature as accurate and evenly as possible. To protect the electrical cables 7 from the insulation 5, a layer of heat resistant stainless steel 7a is mounted on the outside of the electrical trace heating cables 7. Preferably, the stainless steel layer 7a is mounted in a way that it is not gas tight allowing leakage gases to be vented.

The insulation 5 covering the electrical trace heating cables is enclosed by a thin layer 10 made of steel, preferable stainless steel, which stands the temperature. The thin steel layer 10 is covered on the outside with a glass fibre layer 11 and a porous cover. The resulting total insulation is not gas tight and leakages of vapour-gas mixture, which may bleed when a crack occurs in the dust chamber 2 wall, can be vented to the outside atmosphere where they are diluted with excess air and vented immediately to atmosphere. By this means the system is intrinsic safe, as no explosive atmosphere can be generated inside the insulation layer 5.

The body 4 of the dust chamber 2 with external insulation 5 is covered with covering material (housing or shell 12). The shell of all components that get in contact with the vapour-gas mixture is manufactured from stainless steel which has sulphur resistant corrosion characteristics and, preferably, a chromium content between 5 to 50 wt.-%, preferably at least 24 wt.-%, or from a nickel base alloy having sulphur resistant corrosion characteristics.

Figure 3:
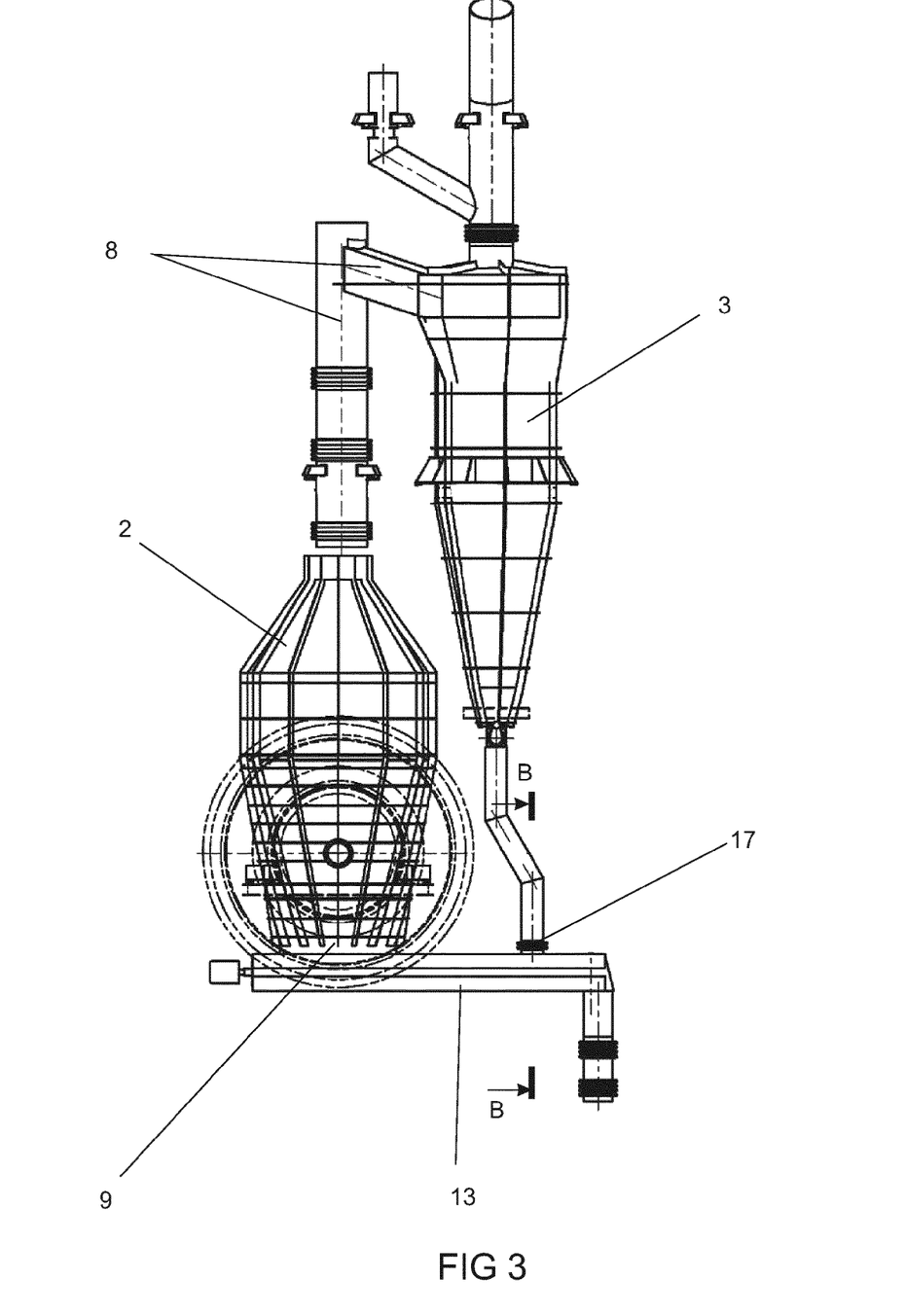
FIG. 3 shows the design of the screw conveyors or feeders of the dust chamber according to an embodiment of the present invention.

The body 4 of dust chamber 2 consists of cylindrical and conical parts, the diameter of the main body is about 1-10 m. Inlet 14 for the vapour-gas mixture containing semi-coke particles is located on one side of the lower part of the main body 4 of the dust chamber 2. Outlet 15 for the semi-coke particles is in the bottom of the main body 4 of dust chamber 2. The height between inlet 14 of vapour-gas mixture containing semi-coke and screw conveyor unit 13 is reduced in comparison to the prior art structures to lower the drop height of semi-coke particles and to avoid dust re-entrainment in the lower part of the dust chamber 2. The outlet chute 9 in the bottom of the dust chamber 2 is connected with screw conveyor unit 13, which comprises at least two conveyors 16 that transports the semi-coke particles from the dust chamber 2 to the furnace. The total area of the dust chamber 2 bottom is covered by screw feeder flights (moving bottom) to reduce the retention time of the semi-coke dust. The fine fraction of the semi-coke particles separated in the cyclone 3 is also fed into one of the screw conveyors 16 at a different feeding point 17 outside the dust chamber vessel.

Figure 5:
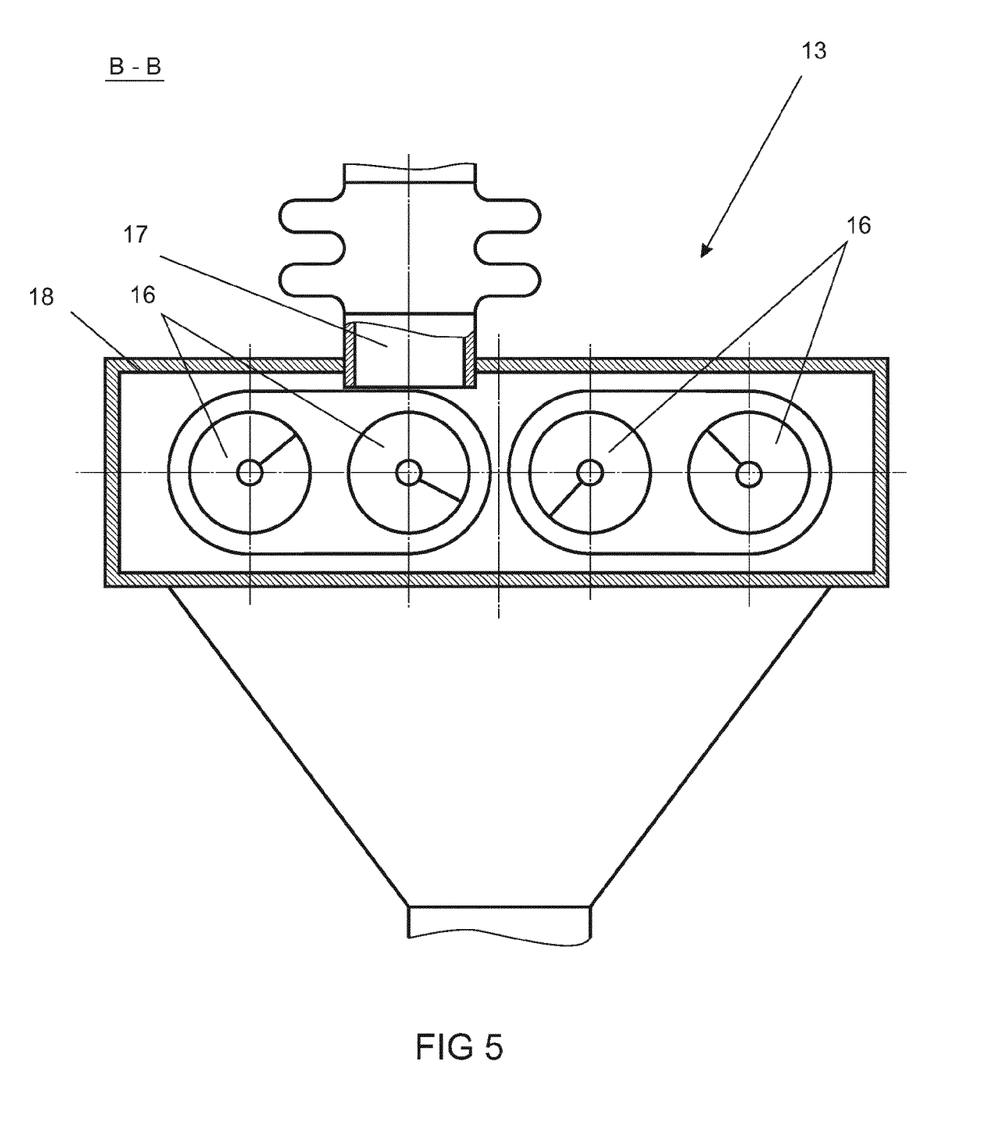

The screw conveyor unit 13 comprises at least two, preferable up to 10 parallel screw conveyor flights 16 for discharge of semi-coke particles from the lower part of the dust chamber 2 or of fine semi-coke particles from cyclone 3 to further technological processing units. The screw conveyor unit 13 comprises the housing 18 which covers all separate conveyor flights 16 to prevent dust escape from the conveyor unit.

In another embodiment the screw conveyor 16 has a stuffing zone at the discharge to seal the pressure difference between cyclone 3 discharge duct 8 and dust chamber 2 wherein the screw feeder has double helix screws, which can be shifted by difference of rotation speed to prevent clogging of solids at the screw feeder plug and flights.

In the separator according to an embodiment of the present invention, the vapour-gas mixture containing semi-coke particles is directed to the main body 4 of the dust chamber 2, where gravity forces heavier semi-coke particles to settle in the lower part of the main body of the dust chamber. The vapour-gas mixture entraining smaller semi-coke particles is directed through the outlet conduit located in the upper end of the main body 4 of dust chamber 2 to cyclone 3, where centrifugal forces help to remove the remaining semi-coke particles. After that the cleaned vapour-gas mixture is directed from the cyclone 3 to further treatment. Whereas the lighter semi-coke particles separated in the cyclone 3 are discharged through a chute from the cyclone to the conveyor unit where the screw conveyor 13 transports the particles to the further processing.

The design of the separator for separating solid particles from the vapour-gas mixture according to an embodiment of this invention allows longer operation campaigns between major shut-downs as refractory damage is eliminated and solid material build-up is completely avoided. Refractory cooling down and degassing prior to any maintenance access is no longer required. The separator corresponding to this invention is not restricted to the embodiments described. It is evident to the skilled person that various modifications are possible within the scope of the appended claims.

LIST OF REFERENCE NUMERALS

1 separator
2 dust chamber
3 cyclone
4 main body
5 external insulation
7 electrical heating cables
7a stainless steel layer
8 connection ducts
9 chutes
10 thin layer
11 glass fibre layer
12 shell
13 screw conveyor unit
14 inlet
15 outlet
16 conveyors
17 feeding point
18 housing of screw conveyor unit

The invention claimed is:

1. A separator for separating solid particles from a vapour-gas mixture, the separator comprising:
    a dust chamber with a main body having an inlet for a vapour-gas mixture containing semi-coke particles and an outlet chute in a bottom of the main body for removal of semi-coke particles, the main body being covered with an external insulation;
    a cyclone, wherein an upper part of the main body is connected to an inlet of the cyclone for removal of fine semi-coke particles from the vapour-gas mixture; and
    a screw conveyor unit connected to a bottom part of the main body; and
    electrical trace heating cables that are in contact with an external surface of the main body of the dust chamber.

2. The separator according to claim 1, wherein a layer of heat resistant stainless steel is mounted on an outside of the electrical trace heating cables to protect the cables from the external insulation and wherein the layer of heat resistant stainless steel is mounted in a way that it is not gas tight allowing leakage gases to be vented.

3. The separator according to claim 1, wherein a material of the external insulation of the main body is a porous mineral wool material enabling leakage gases from the separator to be vented to an outer surface.

4. The separator according to claim 1, wherein the external insulation is surrounded by a housing comprising at least two layers, wherein a first layer is made of glass fibre that protects an insulation layer and wherein a second, outer layer is made of a porous grid that enables leakage gases to be vented.

5. The separator according to claim 1, wherein at least one of the main body, a shell of cyclone and flights of the screw conveyor unit is manufactured from stainless steel having sulphur resistant corrosion characteristics or from a nickel base alloy having sulphur resistant corrosion characteristics.

6. The separator according to claim 1, wherein the screw conveyor unit comprises at least two parallel screw conveyors configured to transport at least one of the semi-coke particles from the dust chamber to a furnace for further technological processing and fine semi-coke particles from the cyclone to further technological processing.

7. The separator according to claim 1, wherein the main body is configured to be electrically trace heated to a temperature of the vapour-gas mixture and wherein a wall temperature of the main body is kept about 0.1 to 300 K higher than the temperature of the vapour-gas mixture inside the dust chamber.

8. The separator according to claim 1, wherein at least one of the cyclone, connection ducts and chutes are electrically trace heated.

9. The separator according to claim 1, further comprising electrical trace heating, wherein electrical heat circuits of the electrical trace heating are divided into different zones to control a wall temperature accurately and evenly.

10. The separator according to claim 1, wherein the screw conveyor unit comprises a housing covering a plurality of screw conveyors.

11. The separator according to claim 1, wherein the main body of the dust chamber is provided with an outlet vent in an upper part of main body to transport the vapour-gas mixture containing semi-coke particles to the cyclone.

12. The separator according to claim 1, wherein said screw conveyor unit contains an inlet which is connected with a dust channel of the cyclone.

13. The separator according to claim 12, wherein the screw conveyor unit has a stuffing zone at a discharge to seal the pressure difference between cyclone discharge duct and dust chamber.

14. The separator according to claim 1, wherein the screw conveyor unit has double helix screws, which are shiftable by a difference of rotation speed to prevent clogging of solids.

15. A separator for separating solid particles from a vapour-gas mixture, the separator comprising:
- a dust chamber with a main body having an inlet for a vapour-gas mixture containing semi-coke particles and an outlet chute in a bottom of the main body for removal of semi-coke particles, the main body being covered with an external insulation, a material of the external insulation of the main body being a porous mineral wool material enabling leakage gases from the separator to be vented to an outer surface;
- a cyclone, wherein an upper part of the main body is connected to an inlet of the cyclone for removal of fine semi-coke particles from the vapour-gas mixture; and
- a screw conveyor unit connected to a bottom part of the main body.

16. A separator for separating solid particles from a vapour-gas mixture, the separator comprising:
- a dust chamber with a main body having an inlet for a vapour-gas mixture containing semi-coke particles and an outlet chute in a bottom of the main body for removal of semi-coke particles, the main body being covered with an external insulation;
- a cyclone, wherein an upper part of the main body is connected to an inlet of the cyclone for removal of fine semi-coke particles from the vapour-gas mixture; and
- a screw conveyor unit connected to a bottom part of the main body,
- wherein at least one of the cyclone, connection ducts and chutes are electrically trace heated.

* * * * *